United States Patent
Yamauchi (10) Patent No.: US 7,965,035 B2
(45) Date of Patent: Jun. 21, 2011

(54) LIGHT-EMITTING DEVICE, METHOD FOR MANUFACTURING LIGHT-EMITTING DEVICE, AND IMAGE DISPLAY APPARATUS

(75) Inventor: Taisuke Yamauchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 11/538,974

(22) Filed: Oct. 5, 2006

(65) Prior Publication Data

US 2007/0081253 A1     Apr. 12, 2007

(30) Foreign Application Priority Data

Oct. 11, 2005   (JP) ................. 2005-295971

(51) Int. Cl.
- *H01J 1/62* (2006.01)
- *F21V 7/04* (2006.01)
- *G02B 6/10* (2006.01)

(52) U.S. Cl. ........... 313/506; 385/129; 362/606; 445/24
(58) Field of Classification Search ........... 313/110–112
See application file for complete search history.

(56) References Cited

U.S. PATENT DOCUMENTS

| 6,188,819 | B1 * | 2/2001 | Kosaka et al. ............ 385/39 |
| 7,102,175 | B2 | 9/2006 | Orita |
| 2003/0227678 | A1 * | 12/2003 | Lines et al. ............ 359/486 |
| 2004/0070829 | A1 * | 4/2004 | Kurtz et al. ............ 359/486 |
| 2005/0030611 | A1 * | 2/2005 | Fukshima et al. ........ 359/321 |
| 2005/0213310 | A1 * | 9/2005 | Takeda ............ 362/19 |
| 2006/0267034 | A1 | 11/2006 | Orita |

FOREIGN PATENT DOCUMENTS

| JP | A 5-072417 | 3/1993 |
| JP | A 2000-221499 | 8/2000 |
| JP | A-2005-5679 | 1/2005 |

* cited by examiner

*Primary Examiner* — Toan Ton
*Assistant Examiner* — Zachary Snyder
(74) *Attorney, Agent, or Firm* — Oliff & Berridge, PLC (57) ABSTRACT

A light-emitting device includes: a light-emitting section disposed on a reference plane and supplying light; and a structure disposed on the light-exiting side of the light-emitting section, wherein the structure includes: a reflective polarizer that transmits polarized light vibrating in a first vibrating direction and reflects polarized light vibrating in a second vibrating direction substantially orthogonal to the first vibrating direction; and an optical section that transmits the light from the reflective polarizer and that cyclically changes in refraction index in the two-dimensional plane substantially parallel to the reference plane.

18 Claims, 11 Drawing Sheets

STEP e

FIG. 12

LIGHT-EMITTING DEVICE, METHOD FOR MANUFACTURING LIGHT-EMITTING DEVICE, AND IMAGE DISPLAY APPARATUS

BACKGROUND

1. Technical Field

The present invention relates to a light-emitting device, a method for manufacturing the light-emitting device, and an image display apparatus, and in particular, relates to a technology of solid-state light-emitting devices such as a light-emitting diode (hereinafter, referred to as an LED as appropriate).

2. Related Art

Projectors or image display apparatuses use, for example, a liquid-crystal spatial light modulator for modulating the light from a light source in response to an image signal. The liquid-crystal spatial light modulator modulates incident light by converting the state of polarization. With the liquid-crystal spatial light modulator, light from a light source can be used effectively by converting the light to polarized light vibrating in a specific direction. Techniques for supplying polarized light in a specific vibrating direction are proposed, for example, in JP-A-5-72417 and JP-A-2000-221499.

In an optical system including a light source and a spatial light modulator, spatial beam divergence can be expressed as the product of emission area and solid angle (etendue, geometrical extent). The spatial light modulator has limitation in the angle of light that can effectively be modulated (for example, within ±16° with respect to the optical axis. To make effective use of the light from the light source in the spatial light modulator, the etendue of the light source must be smaller than that of the spatial light modulator. JP-A-5-72417 proposes a technique of letting light of reduced width in a polarization conversion element. This technique can equalize the luminous flux width at the light-exiting surface of the polarization conversion element to the light source width, whereas it increases the etendue substantially double because the angle of incident light is doubled when the width of the luminous flux of the incident light is reduced.

Furthermore, in recent years it is proposed to use a solid-state light-emitting device as the light source of projectors. A light-emitting diode (hereinafter, referred to as an LED) which is a light-emitting element features microelement, ultralight, and long life. To use LEDs under development for projectors a plurality of LEDs must be used to provide light images. However, even if a lot of LEDs are used, it becomes difficult to make effective use of the light from the light source as the spatial divergence of light incident on the spatial light modulator increases. Accordingly, it is intended to reduce the etendue of the LEDs by controlling the angle of outgoing light with an optical device disposed directly at the light-emitting section of each LED.

With the structure shown in FIG. 1 of JP-A-2000-221499 in which an optical device is disposed at the light-emitting section, the light reflected by the reflective polarizer passes through the optical device and then returns to the light-emitting section. The eight incident on the optical device through the reflective polarizer for polarization conversion is dispersed by the optical device, thus making it difficult to reuse of the light efficiently. Thus, the related arts have problems in difficulty to decrease etendue and supply light at high polarization conversion efficiency.

SUMMARY

An advantage of some aspects of the invention is to provide a light-emitting device in which the etendue can be decreased and which can supplies light at high polarization conversion efficiency, a method for manufacturing the light-emitting device, and an image display apparatus.

According to a first aspect of the invention, there is provided a light-emitting device including: a light-emitting section disposed on a reference plane and supplying light; and a structure disposed on the light-exiting side of the light-emitting section. The structure includes: a reflective polarizer that transmits polarized light vibrating in a first vibrating direction and reflects polarized light vibrating in a second vibrating direction substantially orthogonal to the first vibrating direction; and an optical section that transmits the light from the reflective polarizer and that cyclically changes in refraction index in a two-dimensional plane substantially parallel to the reference plane.

The polarized light in the first vibrating direction which is incident on the reflective polarizer from the light-emitting section passes through the reflective polarizer The polarized light in the second vibrating direction which is incident on the reflective polarizer from the light-emitting section is reflected by the reflective polarizer. The polarized light in the second vibrating direction which is reflected by the reflective polarizer can be converted to polarized light in the first vibrating direction using, e.g., a reflecting section or a phase plate, and then can be incident on the reflective polarizer. The optical section transmits the light from the reflective polarizer to thereby increase light traveling in the direction substantially parallel to the optical axis. The increase of the light traveling in the direction substantially parallel to the optical axis can decrease the etendue. The structure in which polarization-converted light is incident on the optical section prevents the dispersion of the light traveling toward the light-emitting section to convert polarization, thereby preventing a decrease in light availability. The provision of the optical section can increase the efficiency of extracting the light from the light-emitting section to the exterior. Furthermore, the integration of the light-emitting section and the structure can decrease optical loss on the interface therebetween, thereby enhancing light availability. Thus, a light-emitting device can be provided in which the etendue is decreased and which can emits light at high polarization conversion efficiency.

Preferably, the light-emitting device further includes a phase plate between the light-emitting section and the reflective polarizer. For example, when a λ/4-phase plate is used, linearly polarized light incident on the phase plate is converted to circularly polarized light. The light converted to circularly polarized light by the phase plate is reflected by, for example, a reflecting section, and again incident on the phase plate and as such, its vibrating direction is converted. The vibrating direction of the light can be turned 90 degrees by two times of passage through the λ/4-phase plate. The two times of passage of light through the λ/4-phase plate enables polarized light in the second vibrating direction to be converted to polarized light in the first vibrating direction. This makes it possible to reuse the polarized light in the second vibrating direction, allowing effective use of the light from the light-emitting section.

Preferably, the reflective polarizer includes wires substantially parallel to the second vibrating direction and a transparent layer between the wires. The provision of the transparent layer between the wires enables the light from the reflective polarizer to be incident directly on the optical section without passing through an air layer. Since the light from the reflective polarizer is incident directly on the optical section, the light can be propagated to the optical section while maintaining the radiation distribution characteristic in the transparent layer. Thus, optical loss in the reflective polarizer and the optical section can be reduced. Since the transparent layer is formed between the wires, the projections can easily be formed on the reflective polarizer.

Preferably, the light-emitting device further includes a reflecting section that reflects the light traveling from the reflective polarizer to the light-emitting section toward the reflective polarizer. The polarized light in the second vibrating direction which is reflected by the reflective polarizer is reflected by the reflecting section and then travels again to the reflective polarizer. This makes it possible to reuse the polarized light in the second vibrating direction, allowing effective use of the light from the light-emitting section.

Preferably, the optical section has a plurality of substantially columnar projections. Disposing of the plurality of projections provides the optical section with a structure in which media with different refractive indices, i.e., the component of the optical section and air, are disposed in the two-dimensional plane. Thus, the refraction index of the optical section can be changed in the two-dimensional plane substantially parallel with the reference plane.

Preferably, the projections are arranged such that one projection and two projections adjacent to the one projection form a triangle on a plane substantially parallel to the reference plane. The arrangement of the projections in the form of a triangle enables the optical section to have closely packed projections. This increases the light traveling in the direction substantially parallel to the optical axis, thus providing a preferable radiation characteristic.

Preferably, a quotient of a division of a height of the columnar projection by a diameter of the columnar projection ranges from 2 to 3. This increases the light traveling in the direction substantially parallel to the optical axis, thus providing a preferable radiation characteristic.

Preferably, a quotient of a division of the height of the columnar projection by the diameter of the columnar projection is approximately 2.5. This increases the light traveling in the direction substantially parallel to the optical axis, thus providing a more preferable radiation characteristic.

Preferably, the optical section is constructed such that a quotient of a division of the diameter of the columnar projection by a pitch of the plurality of projections ranges from 0.65 to 0.85. This increases the light traveling in the direction substantially parallel to the optical axis, thus providing a preferable radiation characteristic.

Preferably, the optical section is constructed such that the pitch of the plurality of projections ranges from 500 nm to 2,000 nm. This increases the light traveling in the direction substantially parallel to the optical axis, thus providing a preferable radiation characteristic According to a second aspect of the invention, there is provided a method for manufacturing a light-emitting device that supplies light from a light-emitting section. The method includes: forming a reflective polarizer that transmits polarized light vibrating in a first vibrating direction and reflects polarized light vibrating in a second vibrating direction substantially orthogonal to the first vibrating direction; forming a structure having a reflective polarizer and an optical section by forming the optical section on the reflective polarizer, the optical section cyclically changing in refraction index in the two-dimensional plane; and stacking the structure on the light-emitting section provided on a reference plane substantially parallel to the two-dimensional plane. Thus, a light-emitting device can be provided in which the etendue is decreased and which can emits light at high polarization conversion efficiency. The placing of the structure on the separately formed light-emitting section allows a simple procedure and prevents damages on the light-emitting section. This increases yield and reduces cost.

According to a third aspect of the invention, there is provided a method for manufacturing a light-emitting device that supplies light from a light-emitting section. The method includes: forming a reflective polarizer on the light-emitting section provided on a reference plane, the reflective polarizer transmitting polarized light vibrating in a first vibrating direction and reflecting polarized light vibrating in a second vibrating direction substantially orthogonal to the first vibrating direction; and forming an optical section that cyclically changes in refraction index in the two-dimensional plane substantially parallel to the reference plane. Thus, a light-emitting device can be provided in which the etendue is decreased and which can emits light at high polarization conversion efficiency. The depositing of the components facilitates forming of the light-emitting device by a simple procedure.

According to a fourth aspect of the invention, there is provided an image display apparatus including: a light source including the light-emitting device; and a spatial light modulator that modulates the light from the light source. The use of the light-emitting device can reduce the etendue and provides light at high polarization conversion efficiency. Thus, an image display apparatus can be provided which is capable of displaying bright images with high availability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail below with reference to the drawings.

First Embodiment

Figure 1:
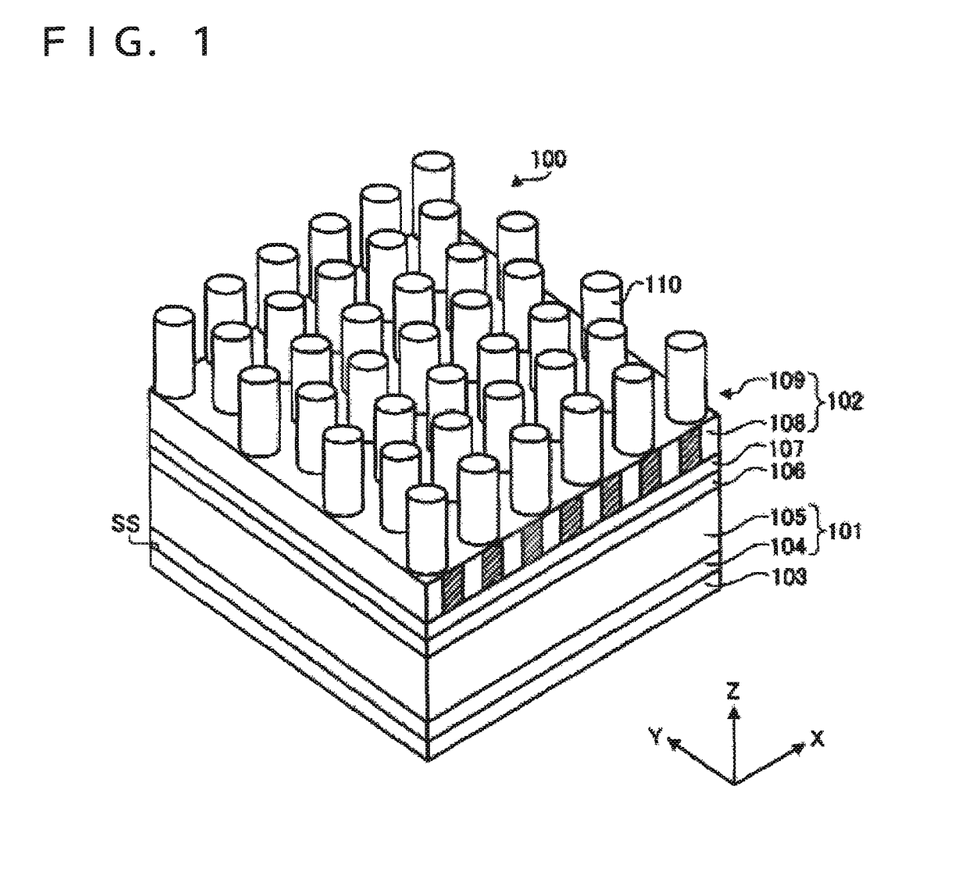
FIG. 1 is a schematic diagram of an LED that is a light-emitting device according to a first embodiment of the invention.

FIG. 1 shows the schematic structure of an LED 100 that is a light-emitting device according to a first embodiment of the invention. The LED 100 includes a light-emitting section 101 and a structure 102. The LED 100 is a surface-emitting light source that emits light mainly from the surface of the light-emitting section 101. The light-emitting section 101 is provided on a reference plane SS and supplies light. The reference plane SS is an X-Y plane orthogonal to Z-axis that is an optical axis. The light-emitting section 101 has an active layer 104 and a transparent substrate 105. The LED 100 has what-is-called a flip-chip structure in which a reflector electrode 103 is disposed opposite to the light-exiting side, on which the light-emitting section 101 is mounted. The transparent substrate 105 is a parallel flat plate made of a transparent member such as sapphire.

The reflector electrode 103 is a reflecting section that reflects the light that travels from a reflective polarizer 108 (to be described later) to the light-emitting section 101 toward the reflective polarizer 108. On the top of the light-emitting section 101, a λ/4-phase plate 106, a substrate 107, and the structure 102 are provided. The reflector electrode 103 is made of a high-reflection metal such as silver. The use of silver provides a reflectance of 90 percent or more when the reflector electrode 103 is formed all over the light-emitting section 101. Also, even if the reflector electrode 103 is in the form of strip, the silver reflector electrode 103 can easily provide a reflectance of 70 percent or more. The λ/4-phase plate 106 is disposed between the light-emitting section 101 and the reflective polarizer 108, to be described later. The substrate 107 is a transparent parallel flat plate. The structure 102 is disposed on the light-exiting side with respect to the light-emitting section 101. The structure 102 is a layered structure of the reflective polarizer 108 and an optical section 109 deposited in this order from the light-emitting section 101.

Figure 2:
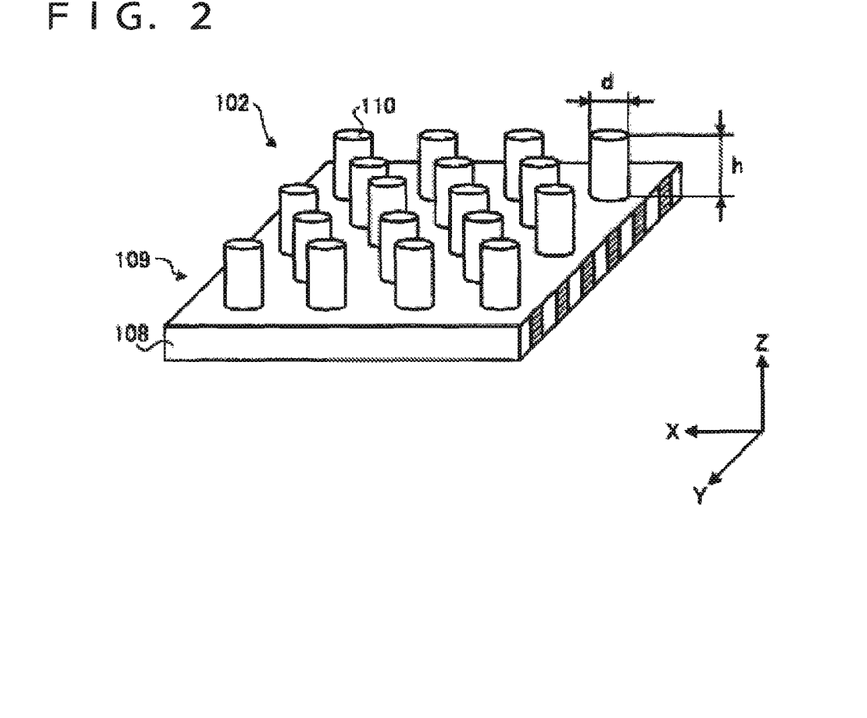
FIG. 2 is a perspective view of a structure.

FIG. 2 is a perspective view of the structure 102. The optical section 109 transmits the light from the reflective polarizer 108. The optical section 109 includes a plurality of projections 110. Each of the projections 110 is a column of diameter d and height h. The projections 110 are made of transparent silicon resin. The silicon resin may be a polymer having a molecular structure in which alkyl is bonded to the side chain of a siloxane bond (—Si—O—).

Figure 3:
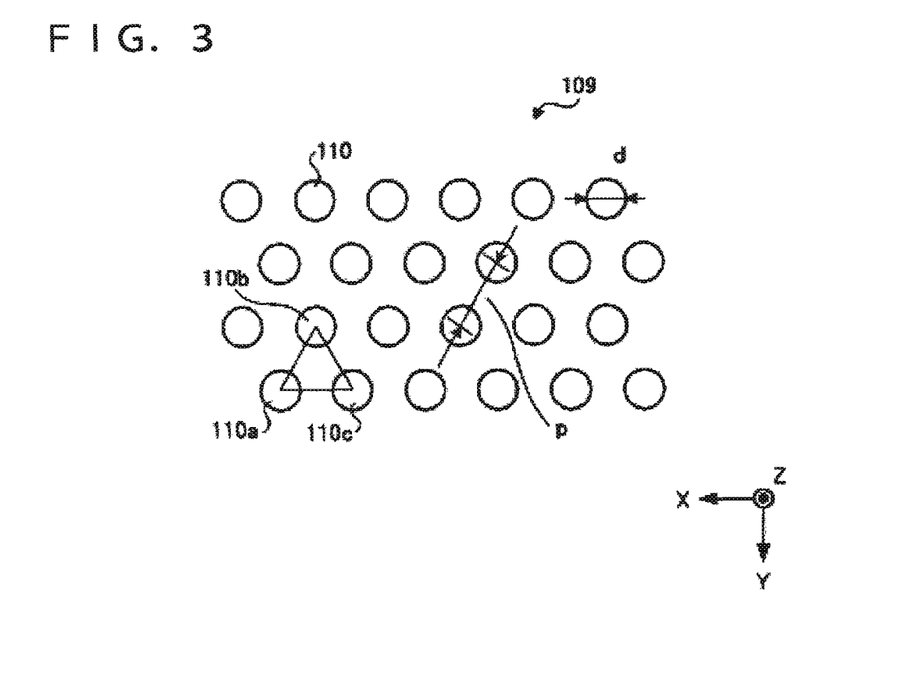
FIG. 3 is a diagram of the arrangement of projections on the X-Y plane.

FIG. 3 shows the arrangement of the projections 110 on the X-Y plane. The optical section 109 is composed the projections 110 arranged at pitch p. The projections 110 are arranged such that one projection 110a and two projections 110b and 110c adjacent to the projection 110a form a right triangle on the X-Y plane that is substantially parallel to the reference plane SS. For one projection 110b, six projections 110 are formed around the projection 110b. The arrangement of the projections 110 in triangular grid form on the X-Y plane enables the optical section 109 to have closely packed projections 110.

Disposing of the plurality of projections 110 provides the optical section 109 with a structure in which two kinds of media with different refractive indices, silicon resin and air, are disposed on the X-Y plane. The projections 110 are placed on the reflective polarizer 108 at regular intervals and as such, the refraction index of the optical section 109 changes regularly in the two-dimensional X-Y direction which is substantially parallel to the reference plane SS. The projections 110 may not necessarily be arranged in triangle grid form as long as they are arranged repeatedly at a predetermined pitch.

Figure 4:
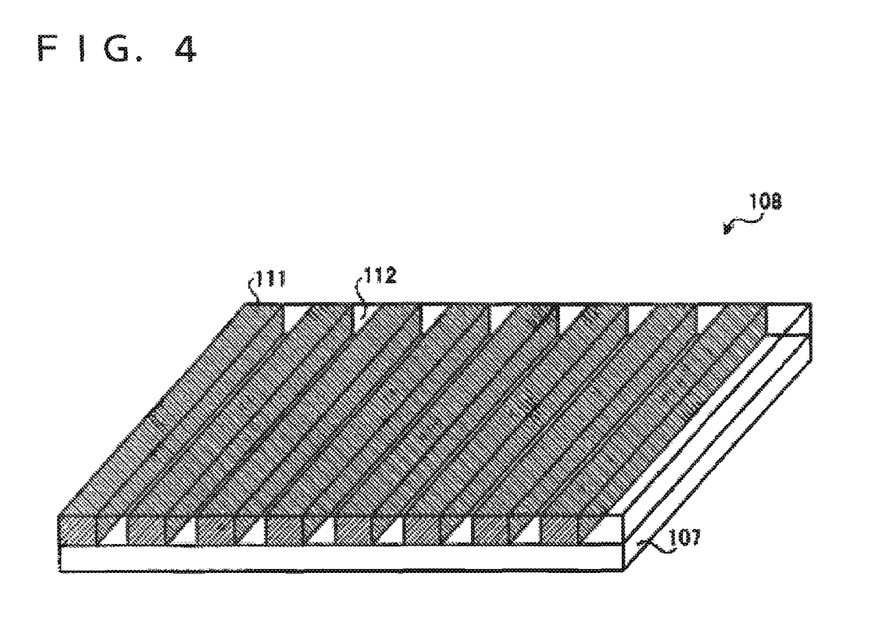
FIG. 4 is a perspective view of a reflective polarizer.

FIG. 4 is a perspective view of the reflective polarizer 108. The reflective polarizer 108 is a wire grid polarizer in which wires 111 made of metal such as aluminum are disposed in grid form on the substrate 107. The wire-grid polarizer transmits polarized light that vibrates in a first direction substantially orthogonal to the wires and reflects polarized light that vibrates in a second direction substantially parallel to the wires. The reflective polarizer 108 is formed substantially in parallel with the second vibrating direction. Thus, the reflective polarizer 108 transmits polarized light that vibrates in the first direction, and reflects polarized light that vibrates in the second direction substantially orthogonal to the first vibrating direction. The polarized light that vibrates in the first direction is, e.g., p-polarized light, while the polarized light that vibrates in the second direction is, e.g., s-polarized light. The reflective polarizer 108 has a transparent layer 112 between the wires 111. The transparent layer 112 can be made of a transparent member having refraction similar to that of the optical section 109.

Figure 5:
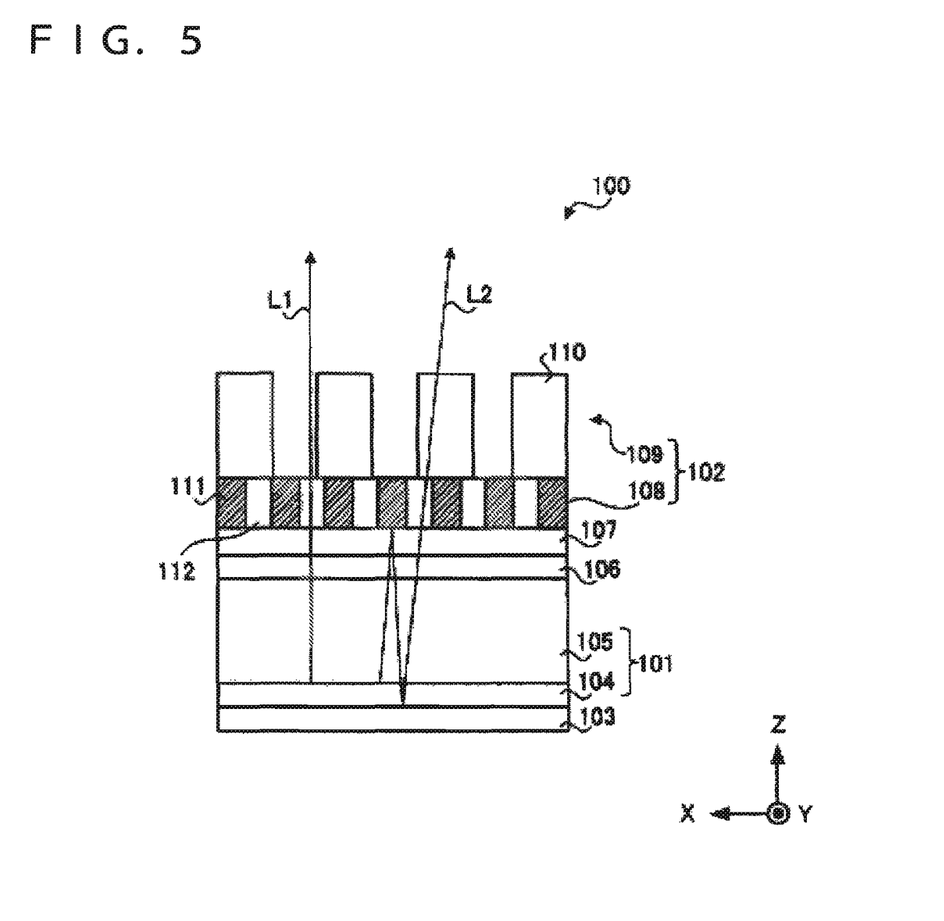
FIG. 5 is a sectional view of an essential part of the LED.

FIG. 5 is a sectional view of an essential part of the LED 100. The light-emitting section 101 supplies light containing p-polarized light and s-polarized light. The light emitted from the active layer 104 of the lights emitting section 101 passes through the transparent substrate 105, the λ/4-phase plate 106, and the substrate 107 onto the reflective polarizer 108. The light emitted from the active layer 104 to fall on the reflector electrode 103 is reflected by the reflector electrode 103 and then travels toward the reflective polarizer 108. Of the light incident on the reflective polarizer 108, p-polarized light L1 which vibrates in the first direction passes through the reflective polarizer 108 onto the optical section 109. The light L1 incident on the optical section 109 through the reflective polarizer 108 passes through the optical section 109 and then travels to a subject to be illuminated.

Disposing of the transparent layer 112 between the wires 111 enables the light L from the reflective polarizer 108 to be directly incident on the optical section 109. Since the light from the reflective polarizer 108 is directly incident on the optical section 109, the light can be propagated to the optical section 109 while maintaining the radiation distribution characteristic in the transparent layer 112. Thus, optical loss in the reflective polarizer 108 and the optical section 109 can be reduced.

Of the light incident on the reflective polarizer 108, s-polarized light L2 which vibrates in the second direction is reflected by the reflective polarizer 108 and then passes through the substrate 107 and the λ/4-phase plate 106. At that time, the s-polarized light L2 is converted to circularly polarized light through the λ/4-phase plate 106. The circularly polarized light L2 incident on the light-emitting section 101 passes through the transparent substrate 105 and the active layer 104 and is then reflected by the reflector electrode 103. The circularly polarized light L2 reflected by the reflector electrode 103 is converted to p-polarized light by the λ/4-phase plate 106. The passage of the light L2 through the λ/4-phase plate 106 two times enables the light vibrating direction to be turned 90 degrees. The sight L2 converted to p-polarized light passes through the reflective polarizer 108 and the optical section 109, and then travels to the subject of illumination.

Figure 6:
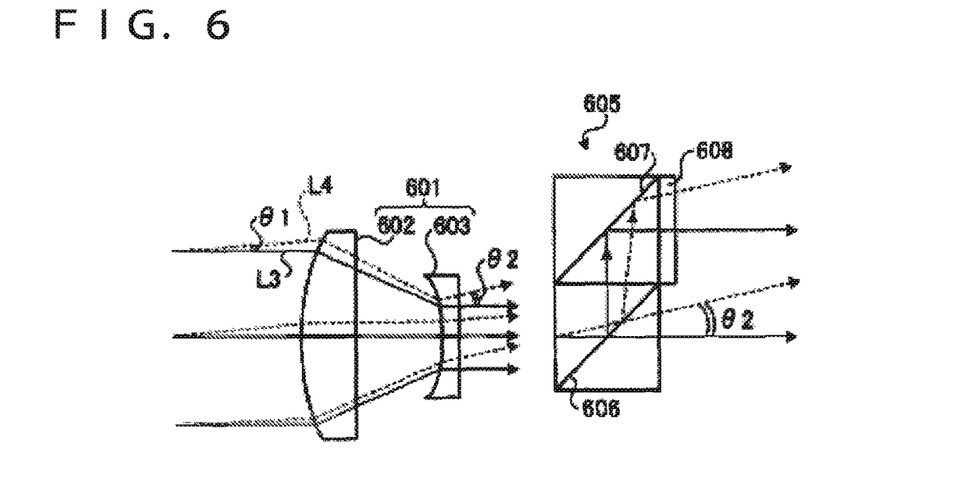
FIG. 6 is a diagram of the structure of a related art for converting the polarization of incident light.

FIG. 6 shows a comparative example of a related-art structure for converting the polarization of incident light. A down collimator 601 reduces the luminous flux width of incident light to substantially a half. A convex lens 602 of the down collimator 601 condenses the incident light. A concave lens 603 collimates the light from the convex lens 602 and let it out. Of the light incident on a polarization conversion element 605 from the down collimator 601, e.g., p-polarized light passes through a polarizing layer 606 and exits from the polarization conversion element 605. Of the light incident on the polarization conversion element 605, e.g., s-polarized light is reflected by the polarizing layer 606 into a reflecting layer 607. The s-polarized light traveling to the reflecting layer 607 is reflected by the reflecting layer 607 and is then incident on a λ/2-phase plate 608. The s-polarized light incident on the λ/2-phase plate 608 is converted to p-polarized light and then exits from the polarization conversion element 605.

With the structure of FIG. 6, the luminous flux width is substantially doubled by the polarization conversion element 605. Thus, reduction of the luminous flux width substantially to one-half by the down collimator 601 can equalize the luminous flux width on the light-exiting surface of the polarization conversion element 605 to the light source width. Here, consider light L4 that forms an angle θ1 with respect to light L3 substantially parallel to the optical axis. The light L4 which passes through the down collimator 601 substantially doubled to θ2 in optical angle from θ1. The optical angle of the light L4 remains at θ2 even through the polarization conversion element 605. As a result, this structure substantially doubles the etendue.

Figure 7:
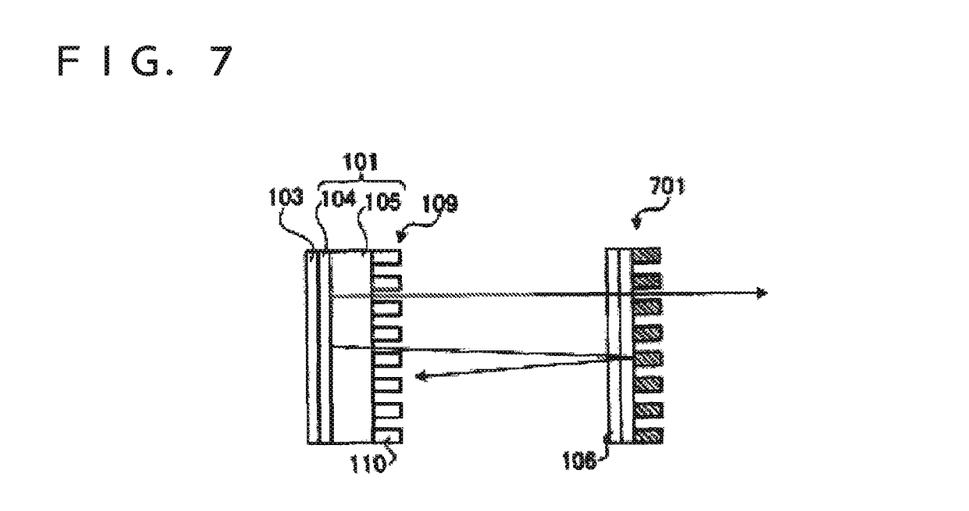
FIG. 7 is a diagram in which a structure for converting polarization is combined with a structure for reducing etendue.

FIG. 7 is another comparative example in which a structure for converting polarization is combined with a structure for reducing etendue. The structure of FIG. 7 has the optical section 109 directly on the light-exiting surface of the light-emitting section 101. Since the optical section 109 is placed directly on the light-exiting surface of the light-emitting section 101, the optical angle of outgoing light can be controlled to reduce the etendue. A reflective polarizer 701 for converting polarization is disposed on the light-exiting side of the optical section 109. The reflective polarizer 701 is disposed apart from the optical section 109 to allow controlling of the optical angle by the optical section 109.

Of the light that has passed through the optical section 109, e.g., p-polarized light passes through the reflective polarizer 701. Of the light that has passed through the optical section 109, e.g., s-polarized light is reflected by the reflective polarizer 701 and then travels to the optical section 109. The light incident on the optical section 109 from the reflective polarizer 701 is dispersed by the optical section 109. This makes it difficult to efficiently reuse the light traveling to the light-emitting section 101 for polarization conversion because of the dispersion by the optical section 109.

In contrast, referring back to FIG. 5, the optical section 109 according to the first embodiment of the invention transmits the light from the reflective polarizer 108 to increase light traveling along the Z-axis substantially parallel to the optical axis. The increase of the light traveling in the direction substantially parallel to the optical axis reduces the etendue. The arrangement in which the light converted in polarization is let in the optical section 109 prevents the dispersion of light traveling to the light-emitting section 101 for polarization conversion, thereby increasing light availability. The provision of the optical section 109 increases the efficiency of extracting the light from the light-emitting section 101 to the exterior. Furthermore, the integrated structure of the light-emitting section 101 and the structure 102 can reduce the optical loss on the interface thereof, thus increasing light availability. This offers the advantages of reducing the etendue and supplying light at high polarization conversion efficiency. The LED 100 which is the light-emitting device according to the embodiment of the invention is useful when it is used in combination with a liquid-crystal spatial light converter that converts polarized light that vibrates in a specific direction.

The structure of the optical section 109 for providing a preferable radiation characteristic will be described. Each of the projections 110 of the optical section 109, described with reference to FIG. 2, is a column having a height h of 1,380 nm and a diameter d of 550 nm. Let the quotient of the division of the height h of the column by the diameter d be an aspect ratio. The aspect ratio of the projection 110 is approximately 2.5. The optical section 109 has the projections 110 arranged such that the pitch p, described with reference to FIG. 3, is 700 nm. The quotient of the division of the diameter d of the column of the projection 110 by pitch p as approximately 0.79.

Figure 8:
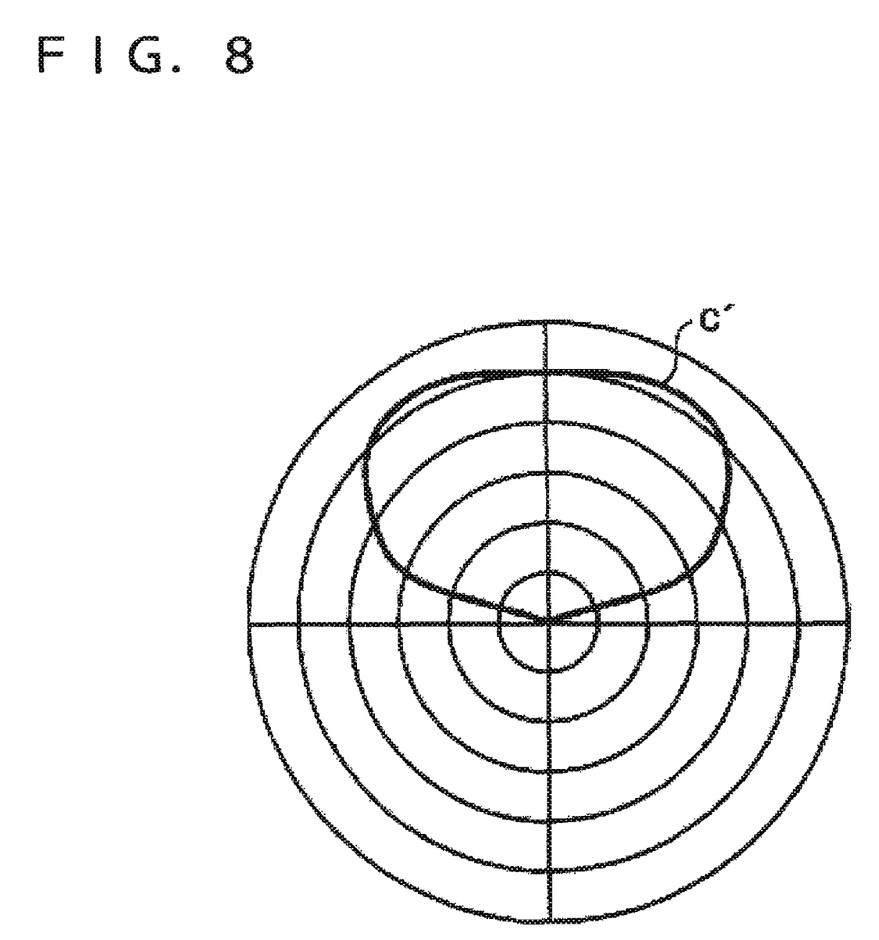
FIG. 8 shows the radiation distribution characteristic of a comparative example.

FIG. 8 shows the radiation distribution characteristic C of an LED of a comparative example in which the transparent substrate 105 is stacked on the light-emitting section 101, which shows that as the curve C' increases in distance from the center of the circle graph, the light traveling in that direction increases. This indicates that the LED having the transparent substrate 105 on the light-emitting section 101 emits light with a horizontally flat radiation distribution characteristic. Even when efficient light supply along the optical axis toward the illumination subject is required as for the light source of a projector, it is difficult for such an LED to supply light efficiently in a specific illuminating direction.

Figure 9:
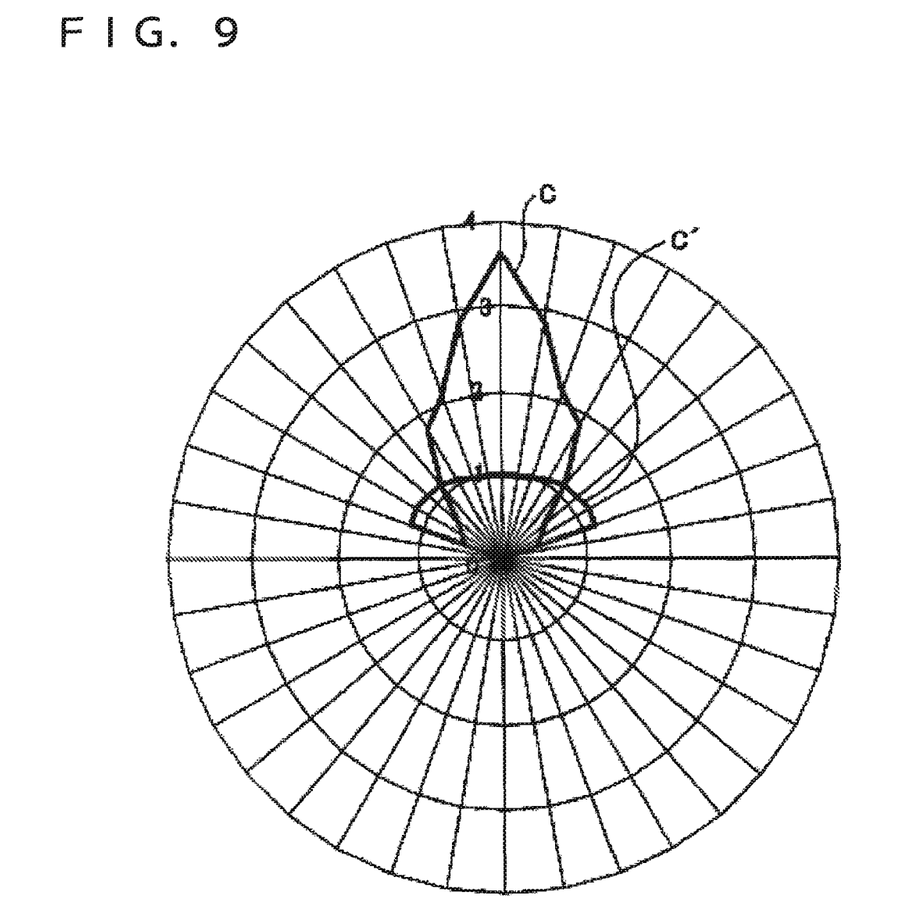
FIG. 9 shows the radiation distribution characteristics of the comparative example and the first embodiment.

FIG. 9 shows the radiation distribution characteristic C' described in FIG. 8 and the radiation distribution characteristic C of the LED 100 of the embodiment. The LED 100 of the embodiment increases in brightness along the optical axis to about 3.5 times as high as that of the LED in which the transparent substrate 105 is stacked on the light-emitting section 101 The absolute light quantity in the angular range of ±30 degrees with respect to the optical axis can be increased to about 2.1 times. The proportion of the light emitted to the angular range of ±30 degrees with respect to the optical axis to the whole light from the LED 100 is 47 percent. The arrangement of the embodiment can increase the light traveling substantially in parallel with the optical axis and provide a preferable radiation characteristic.

The values of height h, diameter d, and pitch p of the projections 110 of the optical section 109 are not limited to the above. For examples the height h and the diameter d of the projections 110 can be set as appropriate so that the aspect ratio of the projections 110 becomes approximately 2.5. The diameter d and the pitch p of the projections 110 can also be set as appropriate so that the quotient of the division of the diameter d by the pitch p becomes approximately 0.79. The pitch p may be in the range from 500 nm to 2,000 nm.

The projections 110 of the optical section 109 may not be limited to have a structure with an aspect ratio of approximately 2.5, and it may suffice as long as the aspect ratio ranges from 2 to 3. This increases the light traveling substantially in parallel with the optical axis and provides a preferable radiation characteristic. The quotient of the division of the diameter d of the projections 110 by the pitch p is not necessarily approximately 0.79 provided that it is in the range from 0.65 to 0.85. This increases the light traveling substantially in parallel with the optical axis and provides a preferable radiation characteristic.

The optimum values of the height h, diameter d, and pitch p of the projections 110 of the optical section 109 are calculated on the assumption that the light is G-light having a wavelength of 525 nm. For R-light and B-light, the light traveling substantially in parallel with the optical axis can also be increased and a preferable radiation distribution characteristic can be provided by the projections 110 having the values in the ranges described in this embodiment.

Second Embodiment

Figure 10:
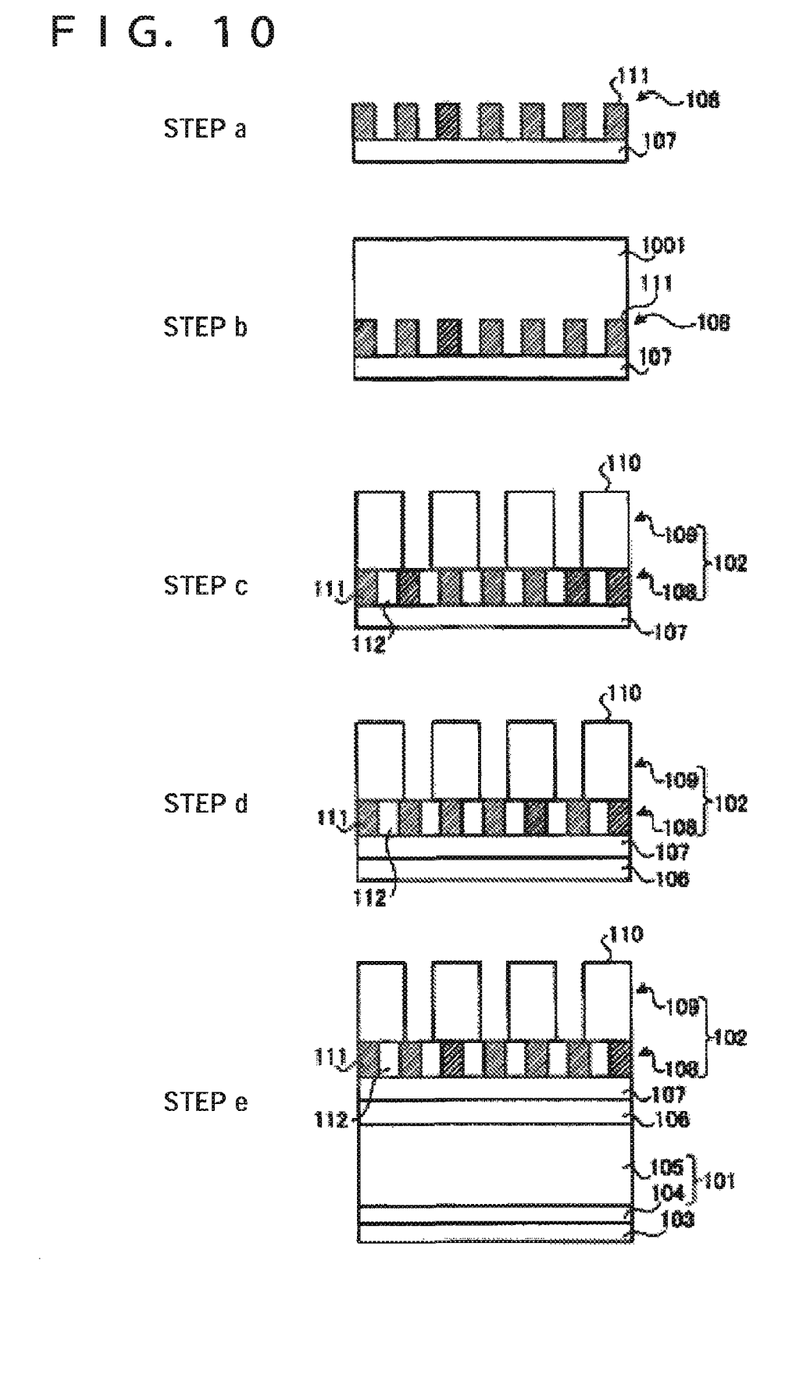
FIG. 10 is a diagram illustrating the procedure of manufacturing the light-emitting device, according to a second embodiment of the invention.

FIG. 10 illustrates the procedure of manufacturing the light-emitting device, according to a second embodiment of the invention. The LED 100 of the first embodiment can be manufactured by the method of manufacture of this embodiment. In step a of forming a reflective polarizer, the reflective polarizer 108 is formed. The reflective polarizer 108 is formed by forming the wires 111 on the substrate 107. The wires 111 may be formed by, e.g., photolithography. In photolithography, a resist layer is formed on a metal layer, and the resist layer is patterned to the shape of the wires 111. The patterned resist layer and the metal layer are etched to form the wires 111.

Alternatively, what is called a nanoinprinting may be used in which die-stamping is applied to nanoscale. The nanoinprinting is a processing technique of forming by pressing a die having fine projections and depressions to a workpiece, allowing pattern forming of a few nanometers in width. The patterning by pressing has the advantages of forming more easily and at lower cost than nanoscale electron beam machining.

Next, in step b, a transparent layer 1001 is formed on the substrate 107 and the wires 111. The transparent layer 1001 can be formed by embedding sol-gel glass between the wires 111, and depositing and flattening it. The transparent layer 1001 is formed such that the thickness from the upper end of the wires 111 to the surface of the transparent layer 1001 agrees with the height of the projections 110.

In step c, the optical section 109 is formed. Step c is a structure forming step of forming the structure 102 including the reflective polarizer 108 and the optical section 109 by forming the optical section 109 on the reflective polarizer 108. The optical section 109 is formed by forming the projections 110 from the transparent layer 1001 on the wires 111. The projections 110 can be formed from the transparent layer 1001 by photolithography or nanoinprinting as for the wires 111. Of the transparent layer 1001, the part between the projections 110 is left to form the transparent layer 112 between the wires 111. The forming of the transparent layer 112 facilitates forming of the projections 110 on the reflective polarizer 108. In step d, the λ/4-phase plate 106 is bonded underneath the substrate 107.

In step e, the λ/4-phase plate 106 formed in step d, the substrate 107, and the structure 102 are stacked on the light-emitting section 101 formed separately. Step e is a structure stacking step for stacking the structure 102 on the light-emitting section 101. Thus the light-emitting device such as the LED 100 can be manufactured. The placing of the structure 102 on the separately formed light-emitting section 101 allows a simple procedure and prevents damages on the light-emitting section 101. This increases yield and reduces cost.

Figure 11A:
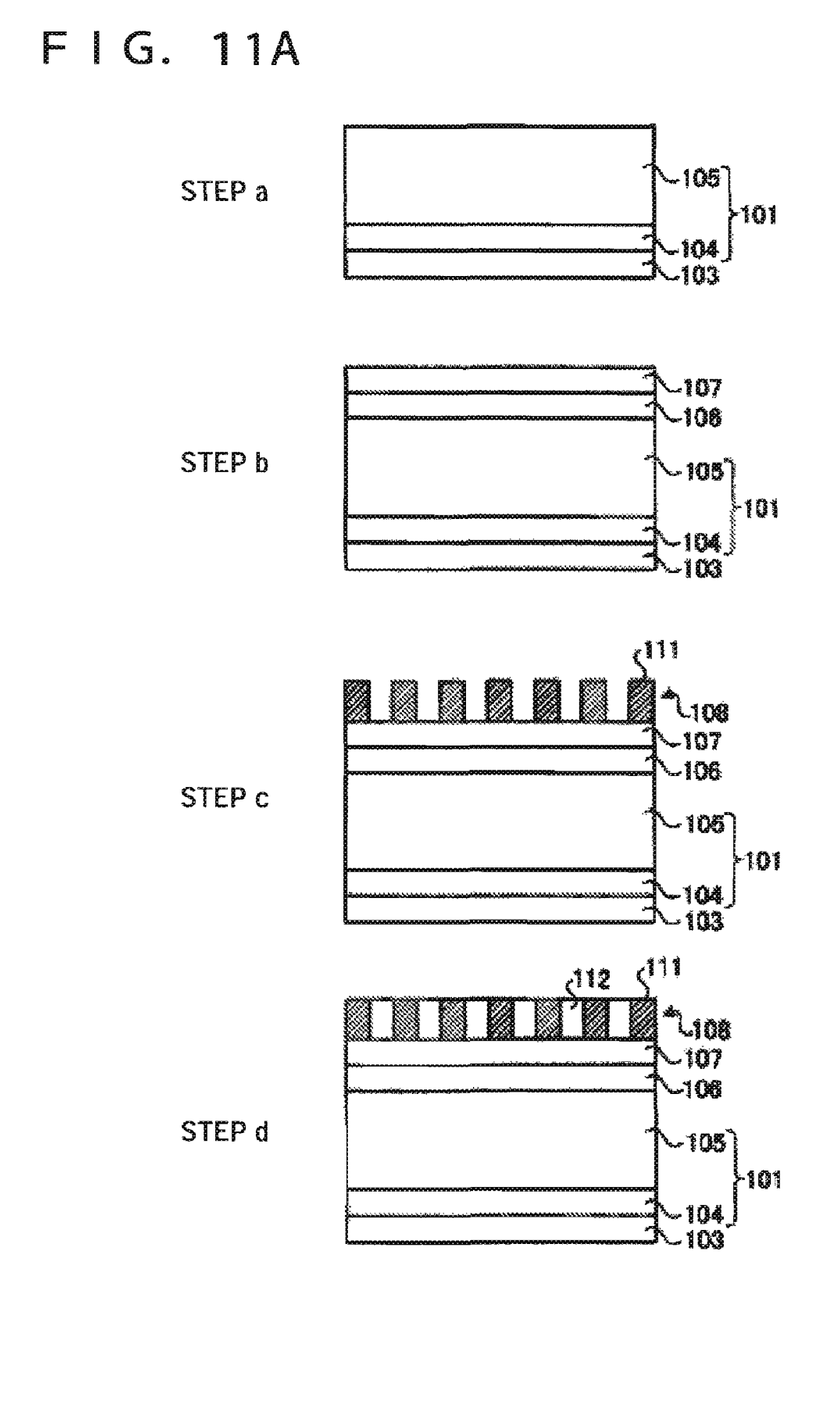
FIG. 11A is a diagram illustrating the procedure of manufacturing the light-emitting device, according to a modification of the second embodiment.
Figure 11B:
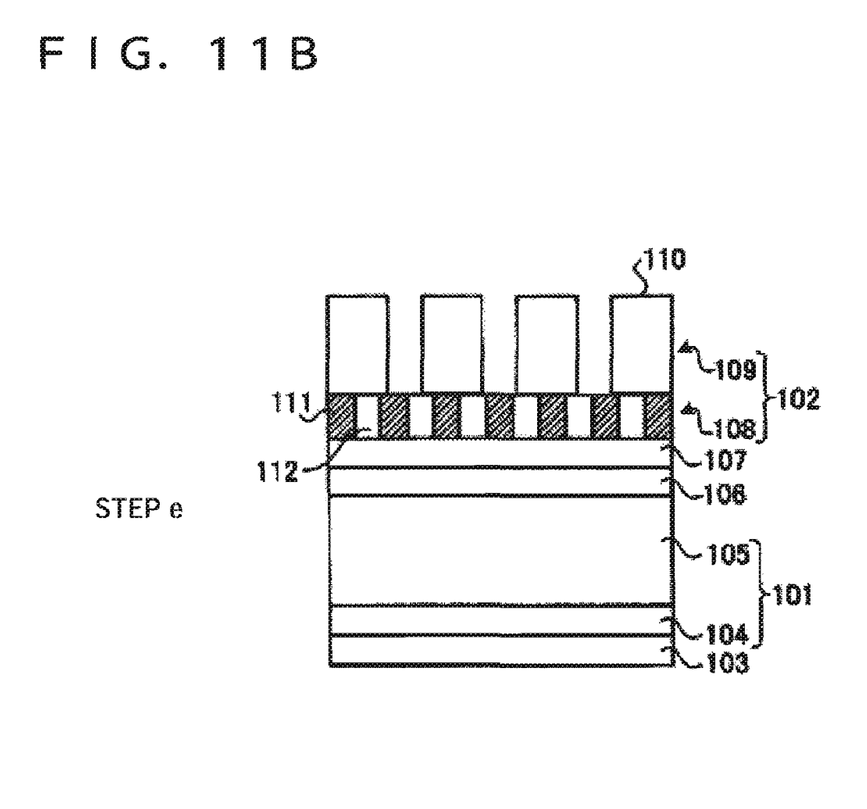
FIG. 11B is a diagram illustrating the procedure of manufacturing the light-emitting device, according to the modification of the second embodiment.

FIGS. 11A and 11B illustrate the procedure of manufacturing the light-emitting device, according to a modification of the second embodiment. In step a of FIG. 11A, the active layer 104 and the reflector electrode 103 are deposited on the transparent substrate 105 in sequence, which are then tuned upside down to thereby form the light-emitting section 101 that emits light upward in FIG. 11A. In step b, the λ/4-phase plate 106 and the substrate 107 are stacked on the light-emitting section 101 formed in step a. Then in step c of forming a reflective polarizer, the reflective polarizer 108 is formed on the light-emitting section 101 with the λ/4-phase plate 106 and the substrate 107 therebetween. The reflective polarizer 108 is formed by forming the wires 111 on the substrate 107.

In step d, the transparent layer 112 is formed between the wires 111. The transparent layer 112 can be formed by embedding sol-gel glass between the wires 111, and flattening it. Referring to FIG. 11B, in step e of forming an optical section, the optical section 109 is formed on the reflective polarizer 108. Thus, a light-emitting device such as the LED 100 can be manufactured. The stacking of the components facilitates forming of the light-emitting device by a simple procedure.

Third Embodiment

Figure 12:
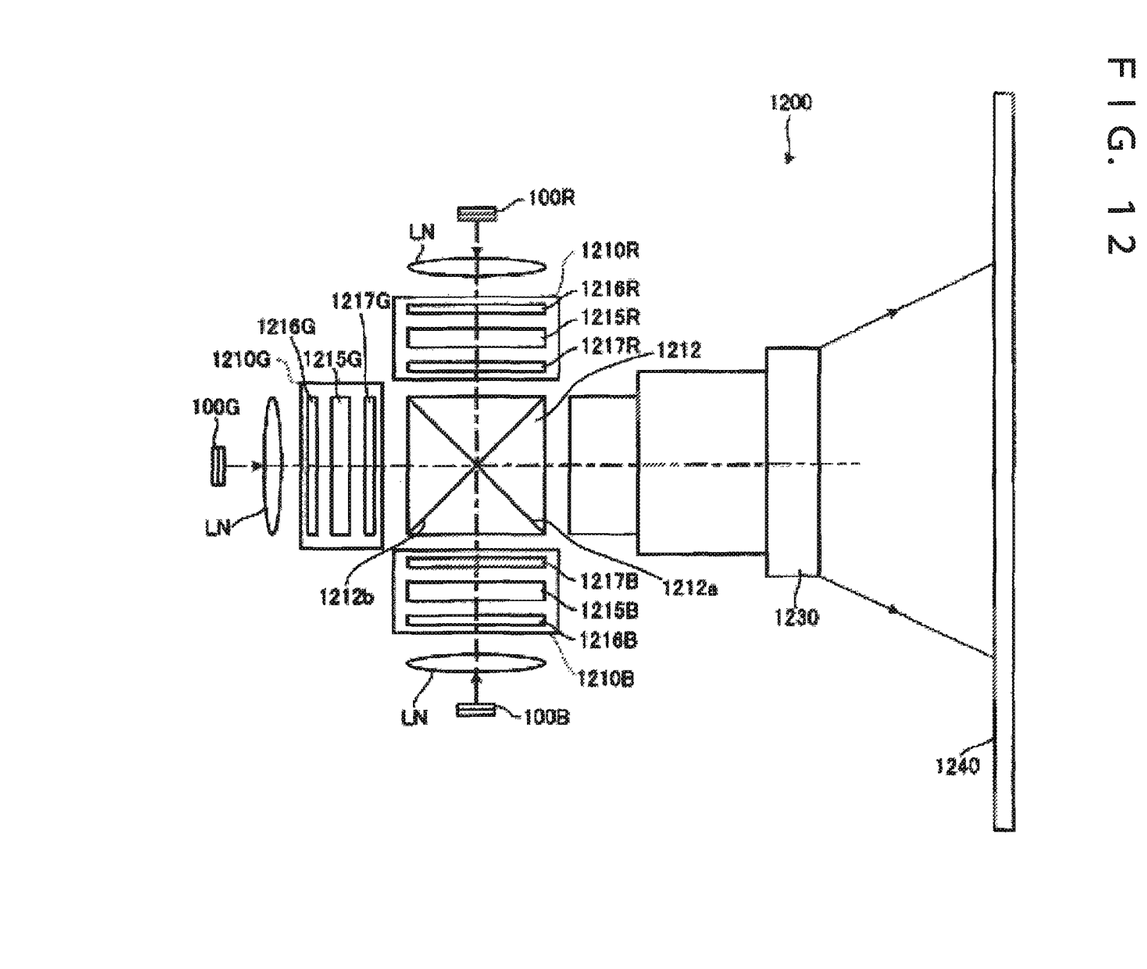
FIG. 12 is a schematic diagram of a projector according to a third embodiment of the invention.

FIG. 12 shows the schematic structure of a projector 1200 that is an image forming apparatus according to a third embodiment of the invention. The projector 1200 includes a light source 100R that supplies R-light, a light source 100G that supplies G-light, and a light source 100B that supplies B-light. The light sources 100R, 100G, and 100B have the same structure as that of the LED 100 of the first embodiment. The R-light from the light source 100R passes through a lens LN into a spatial light modulator 1210R. The spatial light modulator 1210R is a transmissive liquid-crystal display that modulates R-light in response to an image signal. The spatial light modulator 1210R includes a liquid crystal panel 1215R, a first polarizer 1216R, and a second polarizer 1217R.

The first polarizer 1216R transmits p-polarized light of R-light into the liquid crystal panel 1215R. Between the light source 100R and the first polarizer 1216R may be provided a polarization conversion element that converts polarized light other than p-polarized light, e.g., s-polarized light, to p-polarized light. The liquid crystal panel 1215R modulates p-polarized light to s-polarized light according to an image signal. The second polarizer 1217R lets out the R-light converted to s-polarized light by the liquid crystal panel 1215R. Thus, the spatial light modulator 1210R modulates the R-light from the light source 100R in response to an image signal. The R-light modulated to s-polarized light by the spatial light modulator 1210R is incident on a cross dichroic prism 1212.

The G-light from the light source 100G passes through a lens LN into a spatial light modulator 1210G. The spatial light modulator 1210G is a transmissive liquid-crystal display that modulates G-light in response to an image signal. The spatial light modulator 1210G includes a liquid crystal panel 1215G, a first polarizer 1216G, and a second polarizer 1217G. The first polarizer 1216G transmits s-polarized light of the G-light into the liquid crystal panel 1215G. Between the light source 100G and the first polarizer 1216G may be provided a polarization conversion element that converts polarized light other than s-polarized light, e.g., p-polarized light, to s-polarized light. The liquid crystal panel 1215G modulates s-polarized light to p-polarized light according to an image signal. The second polarizer 1217G lets out the G-light converted to p-polarized light by the liquid crystal panel 1215G. Thus, the spatial light modulator 1210G modulates the G-light from the light source 100G in response to an image signal. The G-light modulated to p-polarized light by the spatial light modulator 1210G is incident on the cross dichroic prism 1212 through a surface different from that for the R-light.

The B-light from the light source 100B passes through a lens LN into a spatial light modulator 1210B. The spatial light modulator 1210B is a transmissive liquid-crystal display that modulates B-light in response to an image signal. The spatial light modulator 1210B includes a liquid crystal panel 1215B, a first polarizer 1216B, and a second polarizer 1217B. The first polarizer 1216B transmits p-polarized light of the B-light into the liquid crystal panel 1215B. Between the light source 100B and the first polarizer 1216B may be provided a polarization conversion element that converts polarized light other than p-polarized light, e.g., s-polarized light, to p-polarized light. The liquid crystal panel 1215B modulates p-polarized light to s-polarized light according to an image signal. The second polarizer 1217B lets out the B-light converted to s-polarized light by the liquid crystal panel 1215B. Thus, the spatial light modulator 1210B modulates the B-light from the light source 100B in response to an image signal. The B-light modulated to s-polarized light by the spatial light modulator 1210B is incident on the cross dichroic prism 1212 through a surface different from that for the R-light and the G-light.

The cross dichroic prism 1212 which is a color combining system includes two dichroic filters 1212a and 1312b. The dichroic filters 1212a and 1212b cross at right angles in X-shape. The dichroic filter 1212a reflects R-light which is s-polarized light, and transmits G-light which is p-polarized light. The dichroic filter 1212b reflects B-light which is s-polarized light, and transmits G-light which is p-polarized light. Thus, the cross dichroic prism 1212 combines the R-light, G-light, and B-light modulated by the spatial light modulators 1210R, 1210G, and 1210B, respectively. A projection system 1230 projects the light combined by the cross dichroic prism 1212 onto a screen 1240.

The dichroic filters 1212a and 1212b generally have a high s-polarized-light reflection characteristic. Therefore, the embodiment is constructed such that R-light and B-light, which are to be respectively reflected by the dichroic filters 1212a and 1212b, are incident on the cross dichroic prism 1212 in the form of s-polarized light and that G-light which are to pass through the dichroic filters 1212a and 1212b is incident on the cross dichroic prism 1212 in the form of p-polarized light.

The embodiment is constructed such that the light sources 100R, 100, and 100B emit light to the spatial light modulators 1210R, 1210G, and 1210B, respectively, through the lens LN. Alternatively, it may let the light from the light sources 100R, 100G and 100B directly in the spatial light modulators 1210R, 1210G, and 1210B, respectively, through the exiting openings of the light sources 100R, 100G, and 100B suitable for the spatial light modulators 1210R, 1210G, and 1210B, respectively.

The use of the LED 100 as the light sources 100R, 100G, and 100B can reduce the etendue and supply light at high polarization conversion efficiency. This offers the advantage of displaying light images at high light availability. While the projector 1200 of the embodiment uses a single LED for each light source, a plurality of LEDs may be used as each light source. The LED according to the embodiment of the invention can be reduced in etendue, so that the light from a plurality of light sources can be used efficiently. The effective use of the light from the plurality of LEDs enables lighter images to be displayed.

The projector 1200 uses a transmissive liquid-crystal display. Alternatively, a reflective liquid-crystal display or a tilt-mirror device may be used. The light-emitting device according to the embodiment of the invention may be used not only for the light source of a front projector but also for the light source of a rear projector. The light-emitting device according to the embodiment of the invention may not be limited to the LED but also be other solid-state light-emitting devices including EL devices and semiconductor lasers.

The light-emitting device according to embodiments of the invention is useful for supplying bright light at high light availability, and in particular, is suitable for use in combination with a liquid-crystal spatial light modulator that uses polarized light that vibrates in a specific direction.

The entire disclosure of Japanese Patent Application No. 2005-295971, file Oct. 11, 2005 is expressly incorporated by reference herein.

What is claimed is:

1. A light-emitting device comprising:
    a light-emitting section disposed on a reference plane and supplying light; and
    a structure disposed on a light-exiting side of the light-emitting section, wherein
    the structure includes:
    a reflective polarizer that transmits polarized light vibrating in a first vibrating direction and reflects polarized light vibrating in a second vibrating direction substantially orthogonal to the first vibrating direction, the reflective polarizer including wires substantially parallel to the second vibrating direction and a transparent layer disposed between the wires; and
    an optical section that transmits the light from the reflective polarizer and that cyclically changes in refraction index in a two-dimensional plane substantially parallel to the reference plane, wherein
    the optical section includes a plurality of protrusions formed from a same layer as the transparent layer of the reflective polarizer, and
    the transparent layer is disposed so that light from the reflective polarizer is directly incident on the optical section.

2. The light-emitting device according to claim 1, further comprising a phase plate between the light-emitting section and the reflective polarizer.

3. The light-emitting device according to claim 1, further comprising a reflecting section that reflects the light traveling from the reflective polarizer to the light-emitting section toward the reflective polarizer.

4. The light-emitting device according to claim 1, wherein the optical section has a plurality of substantially columnar projections.

5. The light-emitting device according to claim 4, wherein the projections are arranged such that one projection and two projections adjacent to the one projection form a triangle on a plane substantially parallel to the reference plane.

6. The light-emitting device according to claim 4, wherein a quotient of a division of a height of the columnar projection by the diameter of the columnar projection ranges from 2 to 3.

7. The light-emitting device according to claim 6, wherein the quotient of the division of the height of the columnar projection by the diameter of the columnar projection is approximately 2.5.

8. The light-emitting device according to claim 4, wherein the optical section is constructed such that a quotient of a division of a diameter of the columnar projection by a pitch of the plurality of projections ranges from 0.65 to 0.85.

9. A method for manufacturing a light-emitting device that supplies light from a light-emitting section, the method comprising:
    forming a reflective polarizer that transmits polarized light vibrating in a first vibrating direction and reflects polarized light vibrating in a second vibrating direction substantially orthogonal to the first vibrating direction, the reflective polarizer including wires substantially parallel to the second vibrating direction and a transparent layer disposed between the wires;
    forming a structure having the reflective polarizer and an optical section including a plurality of protrusions by forming the optical section on the transparent layer of the reflective polarizer from a same layer as the transparent layer so that light from the reflective polarizer is directly incident on the optical section, the optical section cyclically changing in refraction index in a two-dimensional plane; and stacking the structure on the light-emitting section provided on a reference plane substantially parallel to the two-dimensional plane.

10. A method for manufacturing a light-emitting device that supplies light from a light-emitting section, the method comprising:

forming a reflective polarizer on the light-emitting section provided on a reference plane, the reflective polarizer transmitting polarized light vibrating in a first vibrating direction and reflecting polarized light vibrating in a second vibrating direction substantially orthogonal to the first vibrating direction, the reflective polarizer including wires substantially parallel to the second vibrating direction and a transparent layer disposed between the wires; and forming an optical section that cyclically changes in refraction index in a two-dimensional plane substantially parallel to the reference plane so that light from the reflective polarizer is directly incident on the optical section, the optical section including a plurality of protrusions and being formed from a same layer as the transparent layer of the reflective polarizer.

11. An image display apparatus comprising:
a light source including the light-emitting device according to claim 1; and
a spatial light modulator that modulates the light from the light source.

12. An image display apparatus comprising:
a light source including the light-emitting device according to claim 2; and
a spatial light modulator that modulates the light from the light source.

13. An image display apparatus comprising:
a light source including the light-emitting device according to claim 3; and
a spatial light modulator that modulates the light from the light source.

14. An image display apparatus comprising:
a light source including the light-emitting device according to claim 4; and
a spatial light modulator that modulates the light from the light source.

15. An image display apparatus comprising:
a light source including the light-emitting device according to claim 5; and
a spatial light modulator that modulates the light from the light source.

16. An image display apparatus comprising:
a light source including the light-emitting device according to claim 6; and
a spatial light modulator that modulates the light from the light source.

17. An image display apparatus comprising:
a light source including the light-emitting device according to claim 7; and
a spatial light modulator that modulates the light from the light source.

18. An image display apparatus comprising:
a light source including the light-emitting device according to claim 8; and
a spatial light modulator that modulates the light from the light source.

* * * * *